US012270406B1

(12) United States Patent
Deng

(10) Patent No.: US 12,270,406 B1
(45) Date of Patent: Apr. 8, 2025

(54) MULTIFUNCTIONAL HANDHELD FAN

(71) Applicant: Shenzhen Aisiting Technology Co., Ltd, Guangdong (CN)

(72) Inventor: Xiaoyi Deng, Hunan (CN)

(73) Assignee: Shenzhen Aisiting Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/921,045

(22) Filed: Oct. 21, 2024

(51) Int. Cl.
*F04D 25/08* (2006.01)
*F21V 33/00* (2006.01)

(52) U.S. Cl.
CPC ........ *F04D 25/084* (2013.01); *F21V 33/0096* (2013.01)

(58) Field of Classification Search
None
See application file for complete search history.

(56) References Cited

U.S. PATENT DOCUMENTS 8,807,814 B1 * 8/2014 Glenn ................ F21V 21/0885 362/580

OTHER PUBLICATIONS

Zhu—CN-116616546-A + machine translation.*
Luo—CN-107725433-A + machine translation.*
SDFM Electric Air Duster YouTube review—https://www.youtube.com/watch?v=pr9FezULCFQ—accessed on Jan. 16, 2025—published on Feb. 20, 2024.*

* cited by examiner

*Primary Examiner* — Juan G Flores
(74) *Attorney, Agent, or Firm* — Nicholas Makridakis

(57) ABSTRACT

A multifunctional handheld fan is disclosed, including a fan main housing with two ends interpenetrated each other. A fan component is provided in the fan main housing, a lighting component is provided at an air outlet of the fan main housing, and a handle component is provided on an outer wall of the fan main housing. The handle component includes a connecting housing, and one end of the connecting housing is threaded with a handle housing. A battery is installed in the handle housing, and one end of the handle housing away from the connecting housing is provided with a flashlight component. By setting up the fan component, the lighting component and the flashlight component, so that the handheld fan of the present disclosure has the functions of blowing, lighting and flashlight, making it suitable for night use and thus is multifunctional.

10 Claims, 3 Drawing Sheets

MULTIFUNCTIONAL HANDHELD FAN

TECHNICAL FIELD

The present application relates to the technical field of fans, and specifically to a multifunctional handheld fan.

BACKGROUND

In the hot summer, fans have become an essential item for people to eliminate heat. With people's demand for convenient use, handheld fans that are more lightweight and portable are more and more popular.

Currently, in the process of using the handheld fans, due to the fact that most handheld fans only have a blowing function, resulting in a single function, which affects the user experience and has low applicability.

SUMMARY

The present disclosure aims to provide a novelty multifunctional handheld fan to address shortcomings in existing technologies.

To achieve above objectives, the present disclosure adopts the following technical solutions.

In some embodiments of the present disclosure, a multifunctional handheld fan is provided, including a fan main housing with two ends interpenetrated each other. Herein a fan component is provided in the fan main housing, a lighting component is provided at an air outlet of the fan main housing, and a handle component is provided on an outer wall of the fan main housing. The handle component includes a connecting housing, and one end of the connecting housing is threaded with a handle housing. A battery is installed in the handle housing, and one end of the handle housing away from the connecting housing is provided with a flashlight component. The flashlight component includes a flashlight accessory threaded with the handle housing, and one end of the flashlight accessory away from the handle housing is provided with a telescopic pipe. Outer walls of the flashlight accessory and the telescopic pipe are sleeved with a focusing barrel set.

As a preferred embodiment of the present disclosure, the fan component includes a tuyere threaded with one end of the fan main housing, the fan main housing is installed a fan motor inside, and a fan impeller is provided on an output shaft of the fan motor.

As a preferred embodiment of the present disclosure, a motor compression ring is provided on one end of the fan motor away from the tuyere for compressing the fan motor, and the motor compression ring is provided with a grid plate inside.

As a preferred embodiment of the present disclosure, the motor compression ring is provided with an annular groove on an inner wall, and the annular groove has a spring coil inside for snap-fit to limit the grid plate.

As a preferred embodiment of the present disclosure, the lighting component includes a fixed ring located at another end of the fan motor, multiple lugs are evenly spaced on one end wall of the fixed ring, and the multiple lugs are provided with fixed rods.

As a preferred embodiment of the present disclosure, a fixed disk is provided on the fixed rods, and an LED light is installed on a side of a middle of the fixed disk facing the tuyere.

As a preferred embodiment of the present disclosure, a first circuit board is installed inside the connecting housing, and a display screen is embedded on the connecting housing.

As a preferred embodiment of the present disclosure, one end of the handle housing near the flashlight accessory is installed with two install fittings and a second circuit board is provided between the two install fittings.

As a preferred embodiment of the present disclosure, the focusing barrel set comprises a first flashlight housing, the first flashlight housing is threaded with a second flashlight housing at one end, and the second flashlight housing is provided with a lens at a temporal part.

As a preferred embodiment of the present disclosure, an interior of the telescopic pipe is provided with a lamp cup by means of bolts, and the lamp cup is installed lamp beads inside that electrically connected with the second circuit board. And an outer wall of the telescopic pipe is provided with a caulking groove, and a silicone ring is disposed in the caulking groove.

The multifunctional handheld fan of the present disclosure has at least the following beneficial effects and advantages. By setting up the fan component, the lighting component and the flashlight component, so that the handheld fan of the present disclosure has the functions of blowing, lighting and flashlight, making it suitable for night use and thus is multifunctional. Furthermore, by cooperation of the focusing barrel set and the telescopic pipe to adjust the focal length of the flashlight component, thereby improving the user experience, enhancing the convenience of the handheld fan, and also improving the applicability of the handheld fan.

BRIEF DESCRIPTION OF THE DRAWINGS

The accompanying drawings are used to provide further understanding of the present disclosure and form a part of the specification, they are used together with the embodiments of the present disclosure to explain the present disclosure and do not constitute limitations on the present disclosure.

Figure 1:
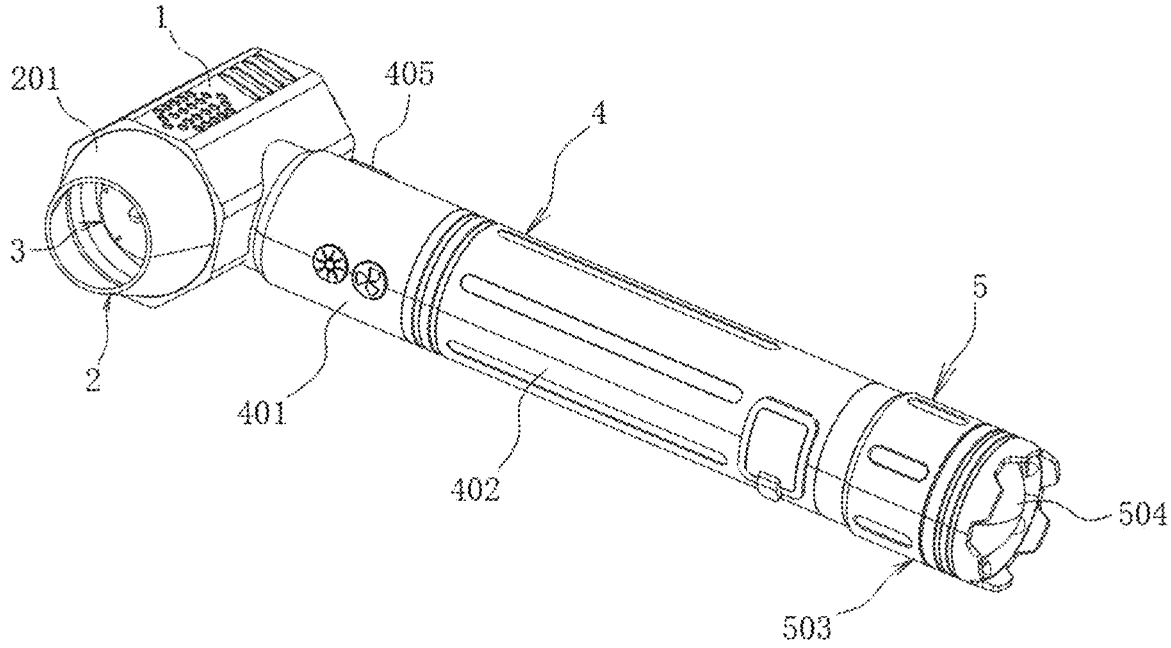
FIG. 1 shows a structural schematic diagram of a multifunctional handheld fan in accordance with some embodiments of the present disclosure.

In the drawings, reference signs are as follows. 1. Fan main housing, 2. Fan component, 201. Tuyere, 202. Fan motor, 203. Fan impeller, 204. Motor compression ring, 205. Grid plate, 206. Annular groove, 207. Spring coil, 3. Lighting component, 301. Fixed ring, 302. Lug, 303. Fixed rod, 304. Fixed disk, 305. LED light, 4. Handle component, 401. Connecting housing, 402. Handle housing, 403. Battery, 404. First circuit board, 405. Display screen, 406. Install fittings, 407. Second circuit board, 5. Flashlight component, 501. Flashlight accessory, 502. Telescopic pipe, 503. Focusing barrel set, 5031. First flashlight housing, 5032. Second flashlight housing, 504. Lens, 505. Lamp cup, 506. Lamp beads, 507. Caulking groove, 508. Silicone ring.

DETAILED DESCRIPTION OF THE EMBODIMENTS

The preferred embodiments of the present disclosure will be described below in conjunction with the accompanying drawings, it should be understood that the preferred embodiments are only for illustrating and explaining the present disclosure, and are not intended to limit the present disclosure.

Embodiments

Referring to FIG. 1 to FIG. 4, in some embodiments of the present disclosure, a multifunctional handheld fan is provided, including a fan main housing 1 with two ends interpenetrated each other. Herein a fan component 2 is provided in the fan main housing 1, a lighting component 3 is provided at an air outlet of the fan main housing 1, and a handle component 4 is provided on an outer wall of the fan main housing 1. The handle component 4 includes a connecting housing 401, and one end of the connecting housing 401 is threaded with a handle housing 402. A battery 403 is installed in the handle housing 402, and one end of the handle housing 402 away from the connecting housing 401 is provided with a flashlight component 5. The flashlight component 5 includes a flashlight accessory 501 threaded with the handle housing 402, and one end of the flashlight accessory 501 away from the handle housing 402 is provided with a telescopic pipe 502. Outer walls of the flashlight accessory 501 and the telescopic pipe 502 are sleeved with a focusing barrel set 503. By setting up the fan component 2, the lighting component 3 and the flashlight component 5, so that the handheld fan of the present disclosure has the functions of blowing, lighting and flashlight, making it suitable for night use and thus is multifunctional. Furthermore, by cooperation of the focusing barrel set 503 and the telescopic pipe 502 to adjust the focal length of the flashlight component 5, thereby improving the user experience, enhancing the convenience of the handheld fan, and also improving the applicability of the handheld fan.

Figure 2:
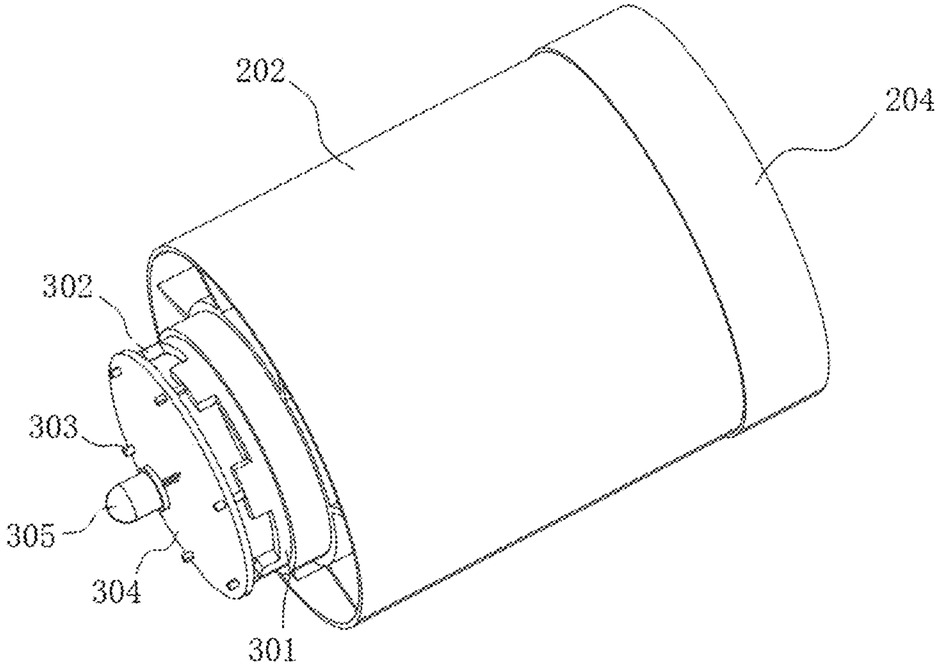
FIG. 2 shows a structural schematic diagram of a lighting component of the multifunctional handheld fan in accordance with some embodiments of the present disclosure.
Figure 3:
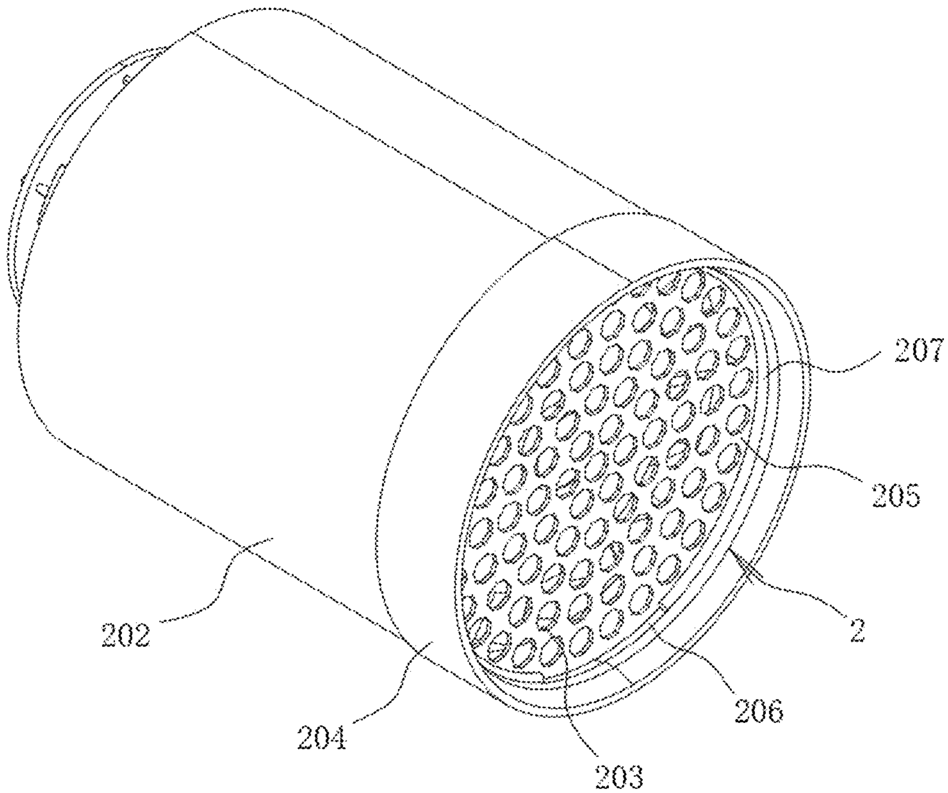
FIG. 3 shows a structural schematic diagram of a fan component of the multifunctional handheld fan in accordance with some embodiments of the present disclosure.

Specifically, as shown in FIG. 1 to FIG. 3, the fan component 2 includes a tuyere 201 threaded with one end of the fan main housing 1, the fan main housing 1 is installed a fan motor 202 inside, and a fan impeller 203 is provided on an output shaft of the fan motor 202. A motor compression ring 204 is provided on one end of the fan motor 202 away from the tuyere 201 for compressing the fan motor 202, and the motor compression ring 204 is provided with a grid plate 205 inside. The fan motor 202 and the fan impeller 203 can be used for blowing and cooling.

Herein the motor compression ring 204 is provided with an annular groove 206 on an inner wall, the annular groove 206 has a spring coil 207 inside for snap-fit to limit the grid plate 205, and the spring coil 207 is used to limit and compress the grid plate 205.

Specifically, referring to FIG. 2, the lighting component 3 includes a fixed ring 301 located at another end of the fan motor 202, multiple lugs 302 are evenly spaced on one end wall of the fixed ring 301, and the multiple lugs 302 are provided with fixed rods 303. A fixed disk 304 is provided on the fixed rods 304, and an LED light 305 is installed on a side of a middle of the fixed disk 304 facing the tuyere 201, which can provide good illumination for the blowing area.

Figure 4:
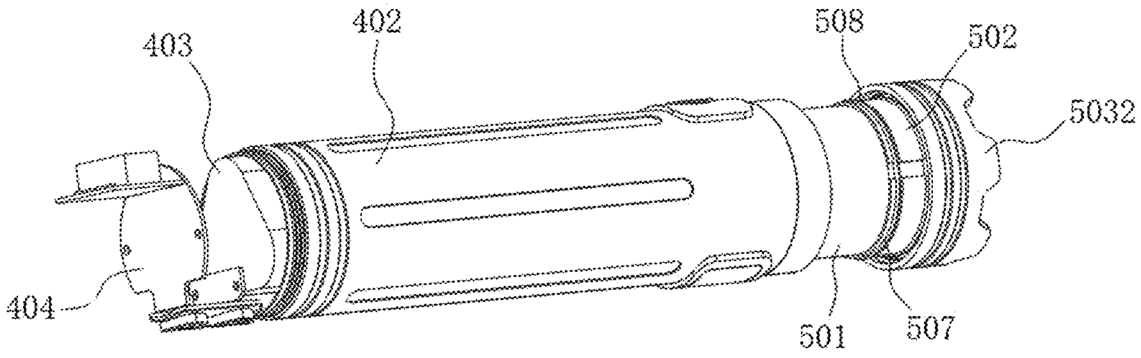
FIG. 4 shows a structural schematic diagram of a handle component of the multifunctional handheld fan in accordance with some embodiments of the present disclosure.
Figure 5:
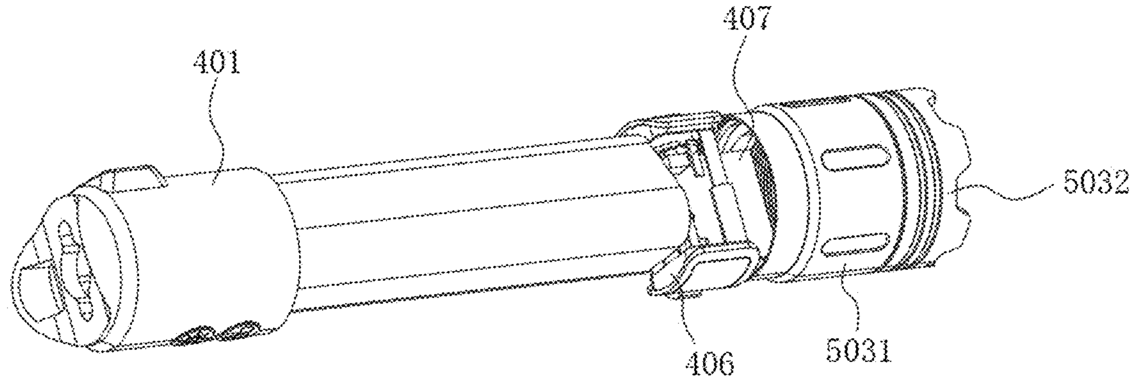
FIG. 5 shows a structural schematic diagram of a focusing barrel set of the multifunctional handheld fan in accordance with some embodiments of the present disclosure.
Figure 6:
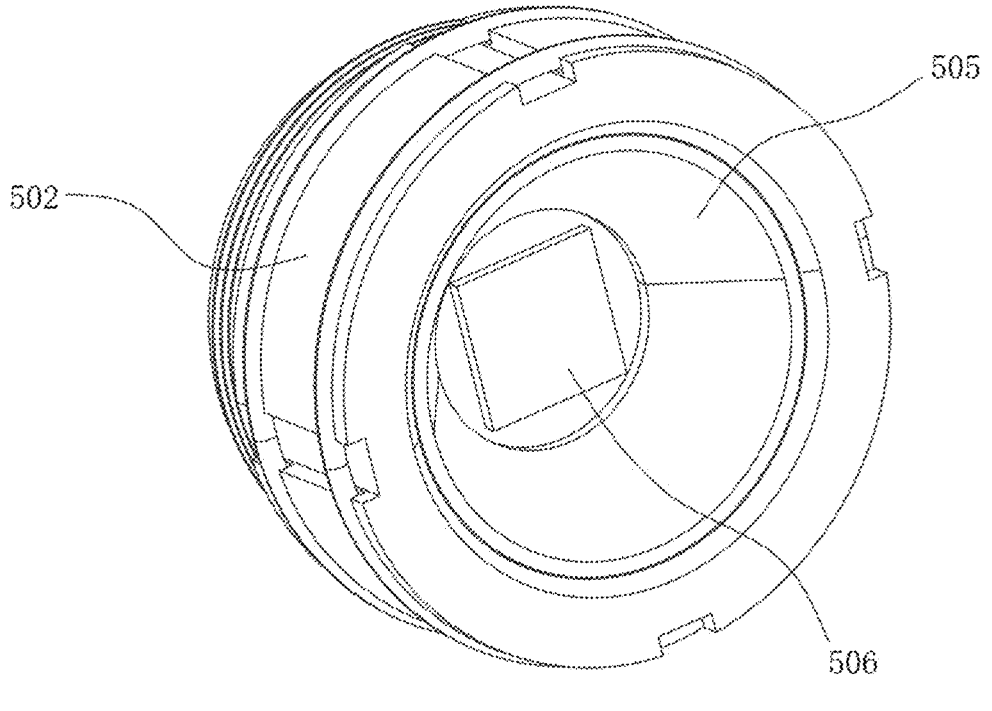
FIG. 6 shows a structural schematic diagram of lamp beads of the multifunctional handheld fan in accordance with some embodiments of the present disclosure.

Specifically, referring to FIG. 1, FIG. 4 and FIG. 5, a first circuit board 404 is installed inside the connecting housing 401, and a display screen 405 is embedded on the connecting housing. 401. The display screen 405, the LED light 305 and the fan motor 202 are all electrically connected to the first circuit board 404, the battery 403 is used to supply power to the display screen 405, the LED light 305, the first circuit board 404 and the fan motor 202. The connecting housing 401 is provided with a button, by pressing the button, the first circuit board 404 can control the start and stop of the display screen 405, the LED light 305 and the fan motor 202.

Herein one end of the handle housing 402 near the flashlight accessory 501 is installed with two install fittings 406, and a second circuit board 407 is provided between the two install fittings 406. The handle housing 402 is provided with a silicone button, by pressing the silicone button to control the second circuit board 407, so as to control the start and stop of the lamp beads 506.

Specifically, referring to FIG. 1, FIG. 4, FIG. 5 and FIG. 6, the focusing barrel set 503 includes a first flashlight housing 5031, the first flashlight housing 5031 is threaded with a second flashlight housing 5032 at one end, and the second flashlight housing 5032 is provided with a lens 504 at a temporal part. An interior of the telescopic pipe 502 is provided with a lamp cup 505 by means of bolts, and the lamp cup 505 is installed lamp beads 506 inside that electrically connected with the second circuit board 407. And an outer wall of the telescopic pipe 502 is provided with a caulking groove 507, and a silicone ring 508 is disposed in the caulking groove 507. The battery 403 is used to provide power to the lamp beads 506 and the second circuit board 407, which can be sued as a flashlight at night and play a role in lighting.

When in use, the multifunctional handheld fan of the present disclosure has the functions of blowing, lighting and flashlight through the fan component, the lighting component and the flashlight component provided, so that the handheld fan can be used at night and thus has multifunctional features. Moreover, by cooperation of the focusing barrel set and the telescopic pipe to adjust the focal length of the flashlight component, thereby improving the user experience, enhancing the convenience of the handheld fan, and also improving the applicability of the handheld fan.

Finally, it should be noted that the above description is only some preferred embodiments of the present disclosure, and is not intended to limit the present disclosure. Although the present disclosure has been described in detail with reference to the above embodiments, it is still possible for one of ordinary skill in the art to modify the technical solutions described in the above embodiments or equivalently replace some of the technical features. Any modification, equivalent substitutions, improvements, etc. made within the concept and principles of the present disclosure shall be included in the scope of protection of the present invention.

What is claimed is:

1. A multifunctional handheld fan, comprising a fan main housing with two ends interpenetrating each other;

wherein a fan component is provided in the fan main housing, a lighting component is provided at an air outlet of the fan main housing, and a handle component is provided on an outer wall of the fan main housing;

wherein the handle component comprises a connecting housing, and one end of the connecting housing is threaded with a handle housing;

wherein a battery is installed in the handle housing, and one end of the handle housing opposite from the connecting housing is provided with a flashlight component;

wherein the flashlight component comprises a flashlight accessory threaded with the handle housing, and one end of the flashlight accessory away from the handle housing is provided with a telescopic pipe; and wherein outer walls of the flashlight accessory and the telescopic pipe are sleeved with a focusing barrel set.

2. The multifunctional handheld fan according to claim 1, wherein the fan component comprises a tuyere threaded with one end of the fan main housing, a fan motor is installed inside the fan main housing, and a fan impeller is provided on an output shaft of the fan motor.

3. The multifunctional handheld fan according to claim 2, wherein a motor compression ring is provided on one end of the fan motor away from the tuyere for compressing the fan motor, and the motor compression ring is provided with a grid plate inside.

4. The multifunctional handheld fan according to claim 3, wherein the motor compression ring is provided with an annular groove on an inner wall, and the annular groove has a spring coil inside for snap-fit to limit the grid plate.

5. The multifunctional handheld fan according to claim 4, wherein the lighting component comprises a fixed ring located at another end of the fan motor, multiple lugs are evenly spaced on one end wall of the fixed ring, and the multiple lugs are provided with fixed rods.

6. The multifunctional handheld fan according to claim 5, wherein a fixed disk is provided on the fixed rods, and an LED light is installed on a side of a middle of the fixed disk facing the tuyere.

7. The multifunctional handheld fan according to claim 1, wherein a first circuit board is installed inside the connecting housing, and a display screen is embedded on the connecting housing.

8. The multifunctional handheld fan according to claim 1, wherein the one end of the handle housing opposite the connecting housing is installed with two install fittings and a second circuit board is provided between the two install fittings.

9. The multifunctional handheld fan according to claim 8, wherein the focusing barrel set comprises a first flashlight housing, the first flashlight housing is threaded with a second flashlight housing at one end, and the second flashlight housing is provided with a lens.

10. The multifunctional handheld fan according to claim 9, wherein an interior of the telescopic pipe is provided with a lamp cup by means of bolts, and lamp beads are installed inside the lamp cup that are electrically connected with the second circuit board; and wherein an outer wall of the telescopic pipe is provided with a caulking groove, and a silicone ring is disposed in the caulking groove.

* * * * *